United States Patent [19]

Federico et al.

[11] Patent Number: 6,093,751
[45] Date of Patent: *Jul. 25, 2000

[54] METHOD FOR THE PRODUCTION OF SUBSTANTIALLY OPEN-CELL POLYSTYRENE SHEET

[75] Inventors: Lanzani Federico, Verolanuova - Brescia; Renato Mauri, Manerbio-Brescia, both of Italy

[73] Assignee: Sirap-Gema S.p.A., Brescia, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/988,775

[22] Filed: Dec. 11, 1997

[51] Int. Cl.⁷ ........................................... C08J 9/14
[52] U.S. Cl. .............................. 521/79; 521/81; 521/139; 521/146; 521/60
[58] Field of Search .................................. 521/79, 81, 60, 521/139, 146

[56] References Cited

U.S. PATENT DOCUMENTS

| | | | |
|---|---|---|---|
| 4,476,077 | 10/1984 | Bullard et al. | 521/79 |
| 5,411,687 | 5/1995 | Imeokparia et al. | 521/79 |
| 5,434,195 | 7/1995 | Imeokparia et al. | 521/79 |
| 5,618,853 | 4/1997 | Vonken et al. | 521/79 |
| 5,650,106 | 7/1997 | Paquet et al. | 521/79 |
| 5,688,832 | 11/1997 | Paquet et al. | 521/79 |
| 5,693,687 | 12/1997 | Imeokparia et al. | 521/79 |
| 5,824,710 | 10/1998 | Imeokparia et al. | 521/79 |

FOREIGN PATENT DOCUMENTS

| | | |
|---|---|---|
| 0090507 | 5/1983 | European Pat. Off. . |
| 0642907 | 3/1995 | European Pat. Off. . |
| 0754632 | 1/1997 | European Pat. Off. . |

OTHER PUBLICATIONS

AMI's 1997 West European Plastics Industry Report; Section 6; The market for general–purpose high–impact polystyrene, p. 63.

AMI's 1997 West European Plastics Industry Report; Section 7; The market for expanded polystyrene.

Expanded Polystyrene by Bertran Geghin, Engineer form the School of High Industrial Studies of Lille (HEI) Marketing Manager Huntsman Chemical Company France S.A.

*Primary Examiner*—Morton Foelak
*Attorney, Agent, or Firm*—Nixon & Vanderhye P.C.

[57] ABSTRACT

A method of producing a substantially open-cell, expanded polystyrene sheet, comprising the steps of:

forming a mixture comprising from 30 to 95% of polystyrene incorporating an aliphatic hydrocarbon with 4–6 carbon atoms, from 0 to 65% of polystyrene, and from 0.2 to 10% of a nucleating agent, mixing the mixture obtained and melting it by heating inside an extruder, bringing the mixture to a temperature of 130–150° C. in the final portion of the extruder, extruding the mixture in a lower-pressure atmosphere to produce an expanded sheet, which has a low density and a high capacity to absorb aqueous liquids, particularly if a surfactant is added to the starting mixture, and which, when coupled with two films of plastics material gives rise to a laminate suitable for the production, by thermoforming, of trays for foods which may release aqueous liquids.

16 Claims, 3 Drawing Sheets

METHOD FOR THE PRODUCTION OF SUBSTANTIALLY OPEN-CELL POLYSTYRENE SHEET

TECHNICAL FIELD

In general, the present invention relates to the packaging of food products, particularly foods such as, for example, meat or fish, which may release blood or other liquids.

In particular, the invention relates to a tray comprising a sheet of substantially open-cell, low-density polystyrene having the capacity to absorb liquids, particularly aqueous liquids, and to a method of producing it.

BACKGROUND OF THE INVENTION

In the packaging of foods which may release blood, such as meat or fish, there is a problem in providing packages which can isolate and hide the blood released by the food, since it has been found that its presence and visibility inside the package renders the latter unattractive to the purchaser.

Amongst the solutions proposed for this problem in the prior art, the simplest consists of the provision of a tray provided with a pad or layer of absorbent material, generally paper. Solutions of this type are described, for example, in patent applications EP-A-O 182 139, GB-A-1 168 925, EP-A-0 544 562, in patent FR 2 688 474, and in utility model DE 9013898.8.

The absorbent layer may simply be fixed to the internal surface of a tray of plastics material or interposed between two sheets of plastics material, of which that which is in contact with the food has holes through which the liquid released by the food is conveyed towards the interposed absorbent layer.

The trays mentioned above have the disadvantage of being made of materials of different kinds, that is, expanded plastics, generally polystyrene, and paper or similar hydrophilic materials, which are difficult to separate from one another so that there is little or no chance of their being recycled. Moreover, owing to the presence of the paper, the production cost of these trays is considerably greater than that of conventional non-absorbent trays.

Trays made of a single material, generally expanded polystyrene, which can isolate the liquid exuded from the food, causing it to descend by gravity into a space formed between two sheets of the aforesaid plastics material by passing through holes formed in the sheet on which the food is placed are also known. Examples of these trays are given in patent applications EP-A-0 574 819 and WO 94/00366.

Trays of the type described above have the disadvantage of necessarily having quite large holes in order to allow the blood to descend by gravity and, for this reason, leave the blood which has collected in the space easily visible. Moreover, the blood can easily return to the sheet which is in contact with the food as a result of the inversion or simply the inclination of the tray.

The technical problem upon which the present invention is based is that of providing a tray which is made solely of plastics material and which itself has the capacity to absorb liquids, particularly aqueous liquids, released by foods, thus preventing the problems set out above with reference to the trays of the prior art.

A partial solution to the aforementioned technical problem was offered in patent application EP 0 090 507, which describes a "fast food" container produced from a composite structure constituted by two superimposed sheets of which one is a normal sheet of closed-cell expanded plastics material and the other is a sheet of substantially open-cell plastics material which has the ability to absorb condensed steam coming from the foods present in the container.

The sheet of substantially open-cell plastics material constitutes the inner layer of the container which is in direct contact with the food.

The aforesaid open-cell sheet has a high density (150–450 g/l), however, and its ability to absorb water is not adequate for the purposes of the present invention.

The open-cell sheet produced according to the method of the aforementioned patent application also has an irregular surface which impairs the appearance of the tray to a certain extent.

According to application EP 0 090 507, the open-cell sheet is produced, by the mixing of polystyrene with an excess of a chemical nucleating and expanding agent such as sodium bicarbonate/citric acid, in an extruder having a single mixing chamber and a single screw, the molten mixture being brought to a temperature of 196–204° C. immediately before extrusion.

SUMMARY OF THE INVENTION

The technical problem set out above is solved, according to the present invention, by a method of producing substantially open-cell polystyrene sheet, comprising the steps of:

forming a mixture comprising from 30 to 95% of polystyrene incorporating an aliphatic hydrocarbon with 4–6 carbon atoms, from 0 to 65% of polystyrene, and from 0.2 to 10% of a nucleating agent, mixing the mixture obtained and melting it by heating inside an extruder, bringing the mixture to a temperature of 130–150° C. in the final portion of the extruder, extruding the mixture in a lower-pressure atmosphere to produce an expanded sheet.

Simply "polystyrene" means polystyrene as such, that is, not incorporating hydrocarbons.

The percentages given herein should be understood as the weight relative to the total weight of the mixture if not specified otherwise.

In order to increase the absorption capacity of the sheet, a quantity of from 5 to 10% by weight of the aforesaid nucleating agent, relative to the total weight of the mixture, is preferably used.

The aforesaid mixture preferably has a content of from 1 to 7% by weight, relative to the weight of the mixture, of aliphatic hydrocarbon with 4–6 carbon atoms and the hydrocarbon is preferably pentane.

The density of the final expanded sheet can be modified by variation of the percentage of polystyrene and, in particular, increases with increases in the aforesaid percentage.

Moreover, there are various types of polystyrene incorporating aliphatic hydrocarbons with 4–6 carbon atoms on the market, which incorporate different quantities of hydrocarbon; the density of the sheets produced from these products decreases as the hydrocarbon content increases.

The aforesaid nucleating agent is preferably selected from the group comprising sodium bicarbonate, citric acid, talc, sodium carbonate, Hydrocerol® and gypsum. This nucleating agent need not necessarily have chemical expanding properties, whereas this constituted an essential condition in the method according to EP-A-0 090 507.

The aliphatic hydrocarbon with 4–6 carbon atoms is preferably constituted by pentane.

In order to give the sheet according to the invention a better capacity to absorb aqueous liquids, a quantity of at least one surfactant variable from 0.2 to 10%, and preferably from 1 to 4%, of the total weight of the mixture is added to the starting mixture.

The at least one surfactant may be selected from the anionic, cationic and non-ionic surfactants in common use, and is preferably a salt of a sulphonic acid of formula R—$SO_3H$ or of a sulphuric ester of formula R—$OSO_3H$, in which R is selected from the group comprising alkyl and alkylaryl, with an alkali metal or an alkaline-earth metal.

A surfactant which has been found particularly useful for the purposes of the present invention is the aliphatic sulphonate marketed by the firm NOVACROME with the name HOSTASTAT SYSTEM E 3904®.

It is advantageous, in order further to increase the capacity of the sheet to absorb aqueous liquids, to add a quantity of up to 30%, preferably from 10 to 20%, of the mixture, of a shock-resistant polystyrene, preferably a dispersion of polybutadiene in polystyrene such as, for example, ENICHEM's product EDISTIR SR 550®.

In comparison with the closest prior art (EP-A-0 090 507), the present method has the advantage of providing a substantially open-cell sheet with a considerably lower density, for a given percentage of open cells, which can therefore absorb a larger volume of liquid for a given weight.

Moreover, the method according to the present invention is carried out at a lower temperature than the aforementioned method of the prior art (130–150° C. instead of 196–204° C.): this has the favourable consequence of a considerable energy saving, an improvement in the aesthetic characteristics of the skin, and better workability of the sheet.

The density of the expanded sheet can easily be adjusted upon the basis of the quantity of polystyrene resin incorporating pentane included in the starting mixture and can be reduced to values of 50 g/l when the polystyrene resin used in the starting mixture is constituted exclusively by polystyrene resin incorporating aliphatic hydrocarbon with 4–6 carbon atoms.

The present invention also relates to a polystyrene tray comprising a base and side walls, made from a sheet of substantially open-cell expanded polystyrene covered integrally on both of its surfaces by a film made of plastics material which defines the inner surface and the outer surface of the tray, respectively, holes with diameters of from 0.1–1.5 mm extending through the inner surface into the thickness of the sheet, wherein the expanded polystyrene sheet has a density less than or equal to 140 g/l and a capacity to absorb aqueous liquids greater than or equal to 4 $g/dm^2$ per mm of thickness and is obtainable by the method described above.

The aforementioned plastics material of which the film is made is preferably selected from the group comprising polystyrene, polyethylene, polypropylene and copolymers thereof.

The film is advantageously opacified to prevent the liquid held in the underlying absorbent sheet from being visible. Opacification can be achieved by the incorporation, in the plastics material, of titanium dioxide or coloured lacquers constituted, for example, by dyes adsorbed on aluminium hydroxide, which generally incorporates small percentages of basic aluminium sulphate.

The high absorption capacity of the expanded sheet according to the present invention is due to its very high percentage of open cells and to the creation of countless receptacles as a result of the rupture of a certain percentage of cells, and also of the so-called "ribs", as can be seen from FIG. 1 which is an electron-microscope photograph of a cross-section of the sheet, enlarged 100 times, showing countless frayed and torn portions both of the cell membranes and of the "ribs".

The high absorption capacity of the sheet is inevitably accompanied by inadequate mechanical strength which causes problems with its use as the sole starting material for producing packaging trays.

In order to produce trays having adequate mechanical strength, it is therefore necessary to couple the sheet, on both of its surfaces, with a film made of plastics material, for example, polystyrene, before the thermoforming of the tray is carried out.

This coupling can be achieved by hot lamination or by means of adhesives, or by any other method conventionally used for this purpose.

The coupling of the sheet of substantially open-cell, expanded polystyrene with the film made of plastics material produces a sheet with a sandwich structure. Holes with diameters of 0.1–1.5 mm are formed in one of the surfaces of the sheet, extending into the intermediate layer constituted by the expanded sheet and, finally, trays are formed therefrom by thermoforming.

Alternatively, the holes may be formed in the base of the tray produced by the thermoforming of the sheet having a sandwich structure.

The trays thus obtained have an optimal appearance since the surface film of plastics material has a smooth surface without streaks or corrugations.

Moreover, the water-repellency of the sheet prevents the blood exuded from the food from wetting the inner surface of the tray creating unpleasant marks, and facilitates its penetration into the underlying absorbent layer through the holes.

By virtue of its low density and hence low weight, the open-cell expanded polystyrene sheet produced by the method described above can also be used as an absorbent layer in place of the paper layers or pads used in trays of the prior art.

In this case, in fact, the absorbent layer is required solely to have a good capacity to absorb aqueous liquids since the mechanical strength of the tray depends solely upon the mechanical properties of the plastics material of which the tray supporting the absorbent layer is made.

The use of the substantially open-cell, expanded sheet produced by the method described above as an absorbent pad for conventional polystyrene trays also solves the problem connected with the difficulty in recycling the materials and a considerable reduction in costs is achieved.

To facilitate the absorption of liquids, the absorbent pad formed with the expanded sheet may advantageously have holes with diameters of 0.1–1.5 mm.

These holes may be formed, for example, by the perforation of the expanded sheet using a needle roller machine.

The surface of the pad which is to be in contact with the food may advantageously be covered with a film of opacified plastics material in order to mask from view the liquid held in the pad.

The use of a pad of this type in the production of a tray according to patent FR 2 688 474 is particularly advantageous.

The advantages of the tray according to the invention will become clear from the detailed description of some embodiments thereof, given below by way of non-limiting example with reference to the appended drawings, in which:

DETAILED DESCRIPTION OF THE INVENTION

Figure 1:
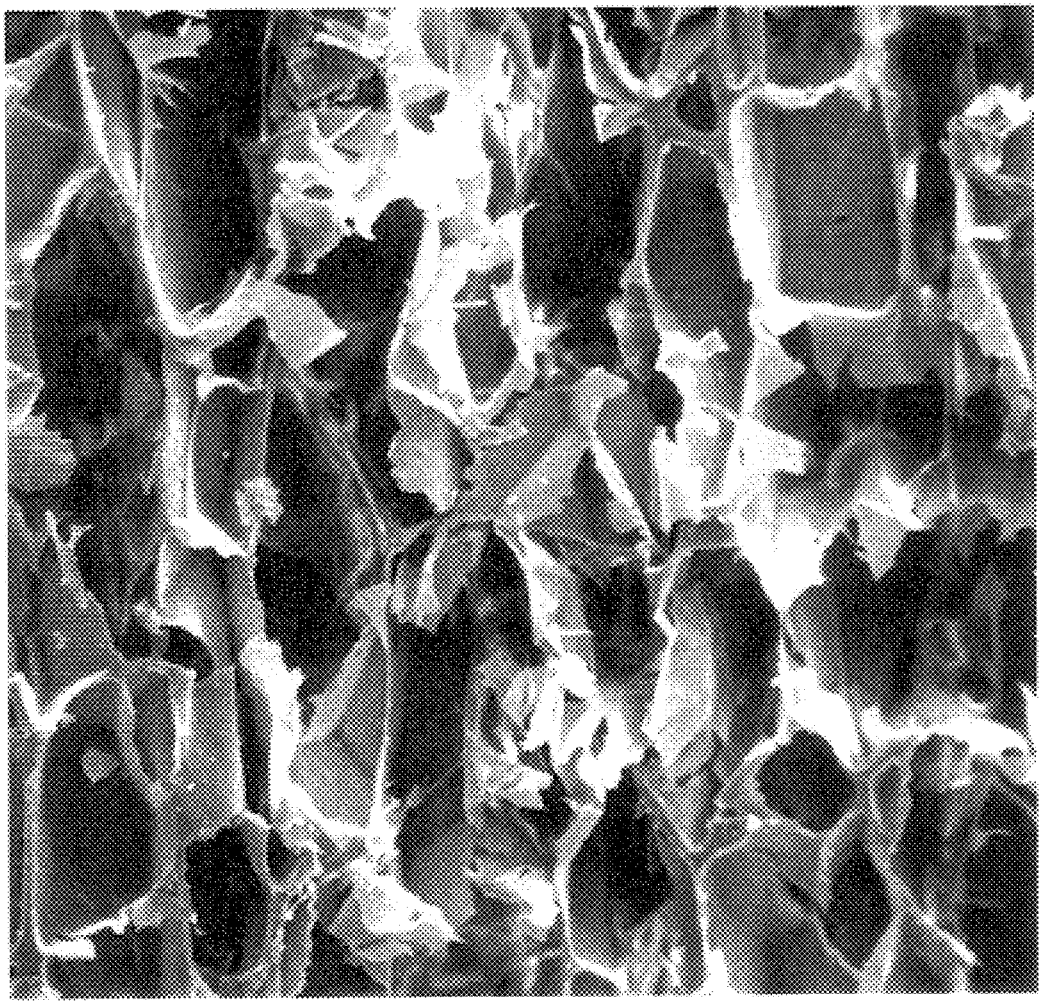
FIG. 1 is a scanned image of a polystyrene sheet according to the present invention.
Figure 2:
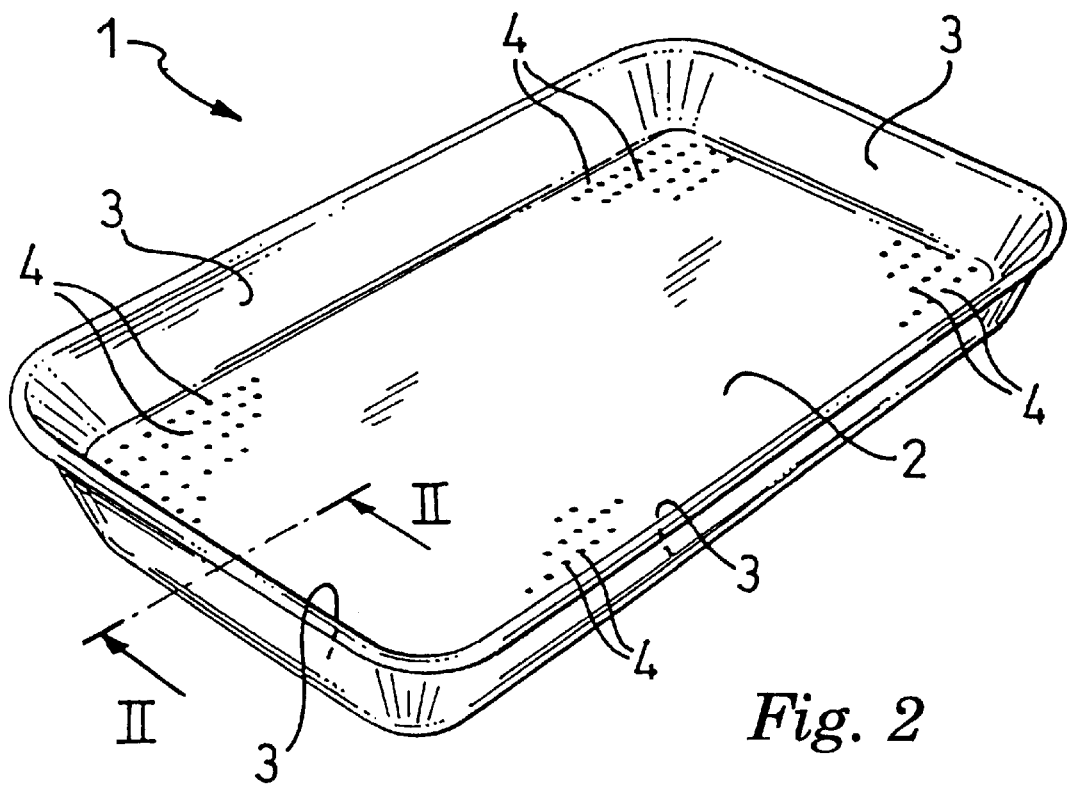
FIG. 2 is a perspective view of a tray according to the invention.

With reference to FIG. 2, a tray according to the invention comprises a body 1 with a base 2 having holes 4 and side walls 3.

Figure 3:
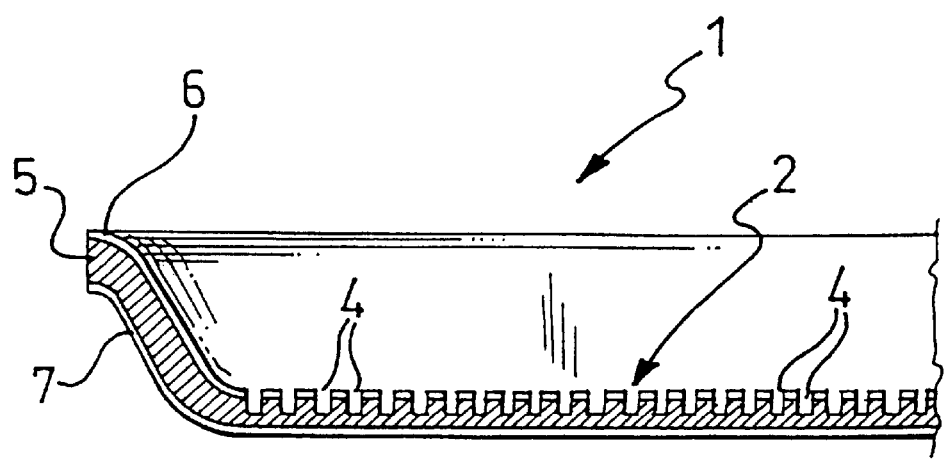
FIG. 3 is a partial transverse section of the tray.

With reference to FIG. 3, the structure of the tray is constituted by a sheet 5 of substantially open-cell, expanded polystyrene, the upper surface of which is covered by a polystyrene film 6 and the lower surface of which is covered by a polystyrene film 7.

The film 6 has a series of holes 4 with diameters of 0.1–1.5 mm which extend into the thickness of the sheet 5.

When a tray of the type described above is used for packaging foods such as, for example, meat, which may release aqueous liquids, the liquid released by the food finds the holes 4 in the film and penetrates the substantially open-cell expanded polystyrene sheet 4 through the holes.

The penetration of the liquid is preferably facilitated by the presence of a surfactant in the sheet 5; the surfactant in fact considerably reduces the natural water-repellency of the plastics material, increasing the adhesion forces between the solid (plastics material) and the liquid until they exceed the cohesion forces between the liquid molecules and allow the liquid to penetrate the substantially open-cell structure of the sheet 5 through the holes 4.

To facilitate the entry of the liquid into the holes 4, recesses centred around the holes 4 may be formed in the upper surface of the base 2.

The substantially open-cell structure of the expanded polystyrene of which the sheet 5 is made has a dense network of capillary channels which put the individual cells into communication and enable them to receive and retain the liquid which has entered through the holes formed in the upper surface of the base 2 of the tray.

The liquid is thus retained as by a sponge and, because of the strong capillary interactions between the channels and the liquid, it can no longer return to the upper surface of the base 2 of the tray by passing through the holes 4, even when the tray is inclined or even inverted.

A great advantage achieved by the trays according to the invention in comparison with those of the prior art, including the tray produced according to the method of patent application EP-A-0 090 507, is constituted by the absence of unpleasant marks on the surface resulting from the spread of blood released by the foods into the absorbent structure as a whole.

In fact, the surface film of plastics material, which is preferably opacified polystyrene, completely masks the presence of the blood of or any other aqueous liquid released by the foods and retained in the underlying substantially open-cell sheet.

Figure 4:
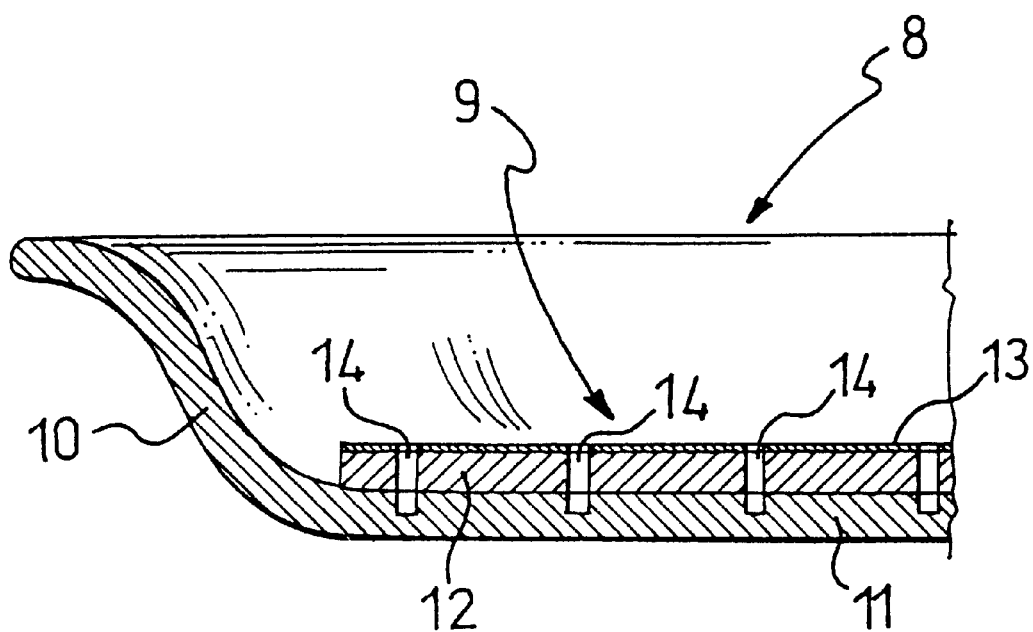
FIG. 4 is a partial transverse section of a tray comprising an absorbent pad formed with the sheet produced by the method according to the invention.

FIG. 4 is a partial transverse section showing a tray 8 having a base 9 and side walls 10 and constituted by a sheet 11 of conventional (closed-cell) expanded plastics material on which an absorbent pad 12 constituted by the substantially open-cell sheet produced by the method according to the invention is superimposed, solely on the base 9 of the tray; a film 13 of thermoplastic material having holes 14 with diameters of 0.1–1.5 mm is applied to the absorbent pad 12. The holes 14 also extend into the absorbent pad 12.

The tray according to the invention and the method of producing it will be described further by means of the following examples, provided by way of non-limiting illustration.

EXAMPLE 1

90kg of VESTYPOR 10N® expandable polystyrene from HÜLS, containing 6.4% by weight of pentane, was mixed with 4.0 kg of HOSTASTAT SYSTEM E 3904® and 6.0 kg of talc powder and supplied into an extruder with two screws, with a cylinder diameter of 122 mm, a length/diameter ratio (L/D) of 20, and a flow rate of 125 kg/h.

The mixture of the aforementioned components, which had already been melted and amalgamated in the first portion of the extruder, was extruded (head pressure 40 bars) through a circular die having a 1 mm opening.

The temperature profile in the various regions of the extruder, from the supply region towards the extrusion head, was as follows:

| T1  | 194° C. |
| --- | ------- |
| T2  | 199° C. |
| T3  | 213° C. |
| T4  | 146° C. |
| T5  | 149° C. |
| T6  | 149° C. |
| T7  | 151° C. |
| T8  | 149° C. |
| T9  | 144° C. |
| T10 | 139° C. |

The temperature of the molten mixture in the region immediately preceding the output of the extruder was 146° C.

The cylindrical, tubular body of expanded plastics material output from the extruder was then subjected to the usual steps of cutting, cooling and winding on reels.

The sheet had a weight of 255 g/m, a thickness of 3.7 mm, and a density of 69 g/l.

The sheet thus produced was sent to a hot lamination step in which a bidirectional white polystyrene film 25 μm thick was applied to each of its surfaces.

The double laminated sheet thus produced was perforated on one of its surfaces by means of metal needles and was sent for thermoforming in order to form therefrom a tray according to the invention.

After immersion in water for 15 minutes, the tray produced showed a specific absorption of 4.5 g/dm$^2$ per mm of thickness.

EXAMPLE 2

76.0 kg of EXTIR A 7000® expandable polystyrene from ENICHEM, containing 6% by weight of pentane, was mixed with 14.0 kg of EDISTIR SR 550® shock-resistant polystyrene, 4.0 kg of HOSTASTAT SYSTEM E 3904® and 6.0 kg of talc and supplied into an extruder with two screws with a cylinder diameter of 122 mm, a length/diameter ratio (L/D) of 20, and a flow-rate of 125 kg/h.

The mixture of the aforementioned components, which had already been melted and amalgamated in the first portion of the extruder was extruded (head pressure 50 bars) through a circular die having a 0.8 mm opening.

The temperature profile in the various regions of the extruder, from the supply region towards the extrusion head, were as follows:

| | |
|---|---|
| T1 | 195° C. |
| T2 | 193° C. |
| T3 | 212° C. |
| T4 | 140° C. |
| T5 | 145° C. |
| T6 | 144° C. |
| T7 | 143° C. |
| T8 | 145° C. |
| T9 | 145° C. |
| T10 | 139° C. |

The temperature of the molten mixture in the region immediately preceding the output of the extruder was 141.5° C.

The cylindrical, tubular body of expanded plastics material output from the extruder was then subjected to the usual steps of cutting, cooling and winding on reels.

The sheet had a weight of 250 g/m², a thickness of 3 mm and a density of 83 g/l.

The sheet thus produced was sent to a hot lamination step in which a bidirectional, white polystyrene film 50 μm thick was applied to each of its surfaces.

The double laminated sheet thus produced was perforated on one of its surfaces by means of metal needles and was sent for thermoforming in order to form therefrom a tray according to the invention.

After immersion in water for 15 minutes, the tray produced had a specific absorption of 4.8 g/dm² per mm of thickness.

EXAMPLE 3

78.0 kg of EXTIR A 7000 expandable polystyrene from ENICHEM, containing 6.5% by weight of pentane, was mixed with 13.0 kg of VESTYRON 314 crystal polystyrene from HÜLS, 4.0 kg of HOSTASTAT SYSTEM E 3904® and 5.0 kg of talc and supplied into an extruder with two screws, with a cylinder diameter of 122 mm, a length/diameter ratio (L/D) of 20, and a flow-rate of 125 kg/h.

The mixture of the aforementioned components, which had already been melted and amalgamated in the first portion of the extruder was extruded (head pressure 40 bars) through a circular die having a 0.8 mm opening.

The temperature profile in the various regions of the extruder, from the supply region towards the extrusion head, was as follows:

| | |
|---|---|
| T1 | 200° C. |
| T2 | 206° C. |
| T3 | 212° C. |
| T4 | 149° C. |
| T5 | 151° C. |
| T6 | 150° C. |
| T7 | 152° C. |
| T8 | 145° C. |
| T9 | 144° C. |
| T10 | 140° C. |

The temperature of the molten mixture in the region immediately preceding the output of the extruder was 143° C.

The cylindrical, tubular body of expanded plastics material output from the extruder was then subjected to the usual cutting and cooling steps.

The sheet had a weight of 245 g/m², a thickness of 3.3 mm and a density of 74 g/l.

The sheet thus produced was sent to a hot lamination step in which a bidirectional, white polystyrene film 100 μm thick was applied to each of its surfaces.

The double laminated sheet thus produced was perforated on one of its surfaces by means of metal needles and was sent for thermoforming in order to form therefrom a tray according to the invention.

After immersion in water for 15 minutes, the tray produced showed a specific absorption of 4.3 g/dm² per mm of thickness.

The tray formed with the sheet produced by the method according to the present invention has a series of advantages in comparison with trays of the prior art.

First of all, in comparison with trays including a pad or layer of absorbent paper material, it offers the advantage of being made solely of plastics material and thus permitting easy recycling. Moreover, the production costs of the tray of the invention are considerably lower than those connected with the manufacture of the above-mentioned trays.

Moreover, when the film of plastics material which covers the absorbent sheet or the absorbent pad included in the tray according to the invention is opacified, any marks from blood or similar liquids released by the foods are masked, which gives the packages produced with the present tray an appearance particularly pleasing to the purchaser.

We claim:

1. A method of producing a substantially open-cell polystyrene sheet, comprising the steps of:
    (a) forming a mixture comprised of (i) from 30 to 95% of polystyrene beads which contain an aliphatic hydrocarbon with 4–6 carbon atoms, (ii) from 0 to 65% of virgin polystyrene beads, and (iii) from 0.2 to 10% of a nucleating agent,
    (b) forming a melt of the mixture obtained in step (a) by heating the mixture inside an extruder
    (c) bringing the melted mixture to a temperature of 130–150° C. in the final portion of the extruder, and
    (d) extruding the melted mixture in a lower-pressure atmosphere to produce an expanded sheet thereof.

2. A method according to claim 1, in which the mixture comprises from 5 to 10% of the nucleating agent.

3. A method according to claim 2, wherein the aliphatic hydrocarbon with 4–6 carbon atoms constitutes 1–7% by weight of the total weight of the mixture.

4. A method according to claim 3, wherein the aliphatic hydrocarbon with 4–6 carbon atoms is constituted by pentane.

5. A method according to claim 2, wherein the nucleating agent is selected from the group comprising sodium bicarbonate, citric acid, talc, sodium carbonate, Hydrocerol® and gypsum.

6. A method according to claim 1, wherein the mixture comprises a quantity variable from 0.2 to 10%, of the total weight of the mixture of at least one surfactant.

7. A method according to claim 6, wherein the at least one surfactant is a salt of a sulphonic acid of formula R—SO$_3$H or of a sulphuric ester of formula R—OSO$_3$H, in which R is selected from the group comprising alkyl and alkylaryl, with an alkali metal or an alkaline-earth metal.

8. A method according to claim 1, wherein the mixture comprises a quantity of up to 30%, of a shock-resistant polystyrene.

9. A method according to claim 6, wherein the mixture comprises a quantity of up to 30% of a shock-resistant polystyrene.

10. A method according to claim 6, wherein the mixture comprises a quantity variable from 1 to 4% of the total weight of the mixture of at least one surfactant.

11. A method according to claim 8, wherein the mixture comprises a quantity of 10 to 20% of the shock-resistant polystyrene.

12. A method as defined in claim 8, wherein the shock-resistant polystyrene is a dispersion of polybutadiene in polystyrene.

13. A method as defined in claim 11, wherein the shock-resistant polystyrene is a dispersion of polybutadiene in polystyrene.

14. A method as defined in claim 6, wherein the mixture comprises a quantity of 10 to 20% of said shock-resistant polystyrene.

15. A method as defined in claim 6, wherein the shock-resistant polystyrene is a dispersion of polybutadiene in polystyrene.

16. A method as defined in claim 14, wherein the shock-resistant polystyrene is a dispersion of polybutadiene in polystyrene.

* * * * *